United States Patent
Wang et al.

(10) Patent No.: US 11,830,275 B1
(45) Date of Patent: Nov. 28, 2023

(54) PERSON RE-IDENTIFICATION METHOD AND APPARATUS, DEVICE, AND READABLE STORAGE MEDIUM

(71) Applicant: INSPUR SUZHOU INTELLIGENT TECHNOLOGY CO., LTD., Jiangsu (CN)

(72) Inventors: Li Wang, Shandong (CN); Baoyu Fan, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/265,242

(22) PCT Filed: Sep. 29, 2021

(86) PCT No.: PCT/CN2021/121901
§ 371 (c)(1),
(2) Date: Jun. 2, 2023

(87) PCT Pub. No.: WO2023/272995
PCT Pub. Date: Jan. 5, 2023

(30) Foreign Application Priority Data

Jun. 29, 2021 (CN) .......................... 202110727876.6

(51) Int. Cl.
*G06V 40/10* (2022.01)
*G06V 10/82* (2022.01)

(52) U.S. Cl.
CPC ............ *G06V 40/103* (2022.01); *G06V 10/82* (2022.01)

(58) Field of Classification Search
None
See application file for complete search history.

(56) References Cited

U.S. PATENT DOCUMENTS

2020/0125897 A1\* 4/2020 Wang ..................... G06V 20/52
2020/0218888 A1\* 7/2020 Gong ................... G06V 40/173
(Continued)

FOREIGN PATENT DOCUMENTS

CN 108764308 A 11/2018
CN 109784182 A 5/2019
(Continued)

OTHER PUBLICATIONS

Baohua, Zhang, et al. "Soft multilabel learning and deep feature fusion for unsupervised person re-identification." Opto-Electronic Engineering 47.12 (2020): 190636-1.

(Continued)

*Primary Examiner* — Leon Flores
(74) *Attorney, Agent, or Firm* — IPro, PLLC

(57) ABSTRACT

A person re-identification method and apparatus, a device, and a readable storage medium. A homogeneous training network of an initial person re-identification network is trained by means of an objective function such as a knowledge synergy for dynamic classification probability loss function to obtain a final person re-identification network carrying more accurate final weight parameters, and a person re-identification task is performed by means of the final person re-identification network. In this way, the accuracy and performance of the person re-identification network to process the person re-identification task may be improved, the storage space in a device may be reduced, more beneficial to the storage and deployment of the portable device, and the amount of calculation of performing the person re-identification task may be reduced, thereby increasing the processing rate of the person re-identification task.

18 Claims, 8 Drawing Sheets

(56) References Cited

U.S. PATENT DOCUMENTS

| | | | | |
|---|---|---|---|---|
| 2020/0226421 A1* | 7/2020 | Almazan | ................ | G06N 3/045 |
| 2020/0285896 A1* | 9/2020 | Huang | ................ | G06V 10/454 |
| 2021/0232813 A1* | 7/2021 | Huang | ................ | G06V 20/52 |
| 2021/0319215 A1* | 10/2021 | Zhang | ................ | G06V 10/764 |
| 2021/0365743 A1* | 11/2021 | Sang | ................ | G06V 40/10 |

FOREIGN PATENT DOCUMENTS

| | | | |
|---|---|---|---|
| CN | 110414368 A | | 11/2019 |
| CN | 110796057 A | | 2/2020 |
| CN | 111368815 A | | 7/2020 |
| CN | 111488833 A | | 8/2020 |
| CN | 112633417 A | | 4/2021 |
| CN | 113191338 A | | 7/2021 |
| KR | 20190068000 A | | 6/2019 |

OTHER PUBLICATIONS

Shu, Xiujun, et al. "Diverse part attentive network for video-based person re-identification." Pattern Recognition Letters 149 (2021): 17-23.

* cited by examiner

PERSON RE-IDENTIFICATION METHOD AND APPARATUS, DEVICE, AND READABLE STORAGE MEDIUM

The present application claims priority to Chinese Patent Application No. 202110727876.6, filed with the China National Intellectual Property Administration on Jun. 29, 2021 and entitled "PERSON RE-IDENTIFICATION METHOD AND APPARATUS, DEVICE, AND READABLE STORAGE MEDIUM", the disclosure of which is hereby incorporated by reference in its entirety.

FIELD

The present application relates to the field of image identification technologies, and more particularly, to a person re-identification (Re-ID) method and apparatus, a device, and a readable storage medium.

BACKGROUND

As an important image identification technology, a person Re-ID technology is widely applied to the fields such as public security systems, traffic control, and the like. The person Re-ID technology searches for cameras distributed at different positions to determine whether persons in fields of view of different cameras are the same. This technology may be used for searching for a criminal suspect, searching for a lost child, or other scenarios. Person Re-ID technology is mainly implemented by using a deep learning technology. Moreover, with constant development of the deep learning technology, network models emerge endlessly, and in order to further improve the accuracy and performance of person Re-ID networks in handling person Re-ID tasks, researchers often design new person Re-ID networks in the direction of deepening or widening the network. Undeniably, with deepening or widening of the network, a learning capability of the network has been continuously enhanced.

SUMMARY

An objective of the present application is to provide a person Re-ID method and apparatus, a device, and a readable storage medium, so as to improve the accuracy and performance of the person Re-ID networks in handling the person Re-ID tasks, reduce occupation of storage space in the device, facilitate the storage and deployment of the portable devices, reduce the calculation amount of executing person Re-ID tasks, and improve the processing speed of person Re-ID tasks without increasing the parameter quality and the calculation amount.

In order to achieve the foregoing objective, the present application provides a person Re-ID method. The method includes:

determining a homogeneous training network corresponding to an initial person Re-ID network, where the homogeneous training network includes a plurality of homogeneous branches with a same network structure;

training the homogeneous training network by using a target loss function, and determining a final weight parameter of each network layer in the homogeneous training network, where the target loss function includes a knowledge synergy for dynamic classification probability (KSP) loss function, and the KSP loss function is used to determine a unidirectional knowledge synergy loss value between the homogeneous branches by using classification-layer output features of each training sample in every two homogeneous branches; and loading the final weight parameter by using the initial person Re-ID network to obtain a final person Re-ID network, to perform a person Re-ID task by using the final person Re-ID network;

where the training the homogeneous training network by using a target loss function and determining a final weight parameter of each network layer in the homogeneous training network includes:

during training of the homogeneous training network, determining a cross-entropy loss value of a cross-entropy loss function, determining a triplet loss value of a triplet loss function, and determining the unidirectional knowledge synergy loss value of the KSP loss function; and determining the final weight parameter of each network layer in the homogeneous training network by using a total loss value of the cross-entropy loss value, the triplet loss value, and the unidirectional knowledge synergy loss value.

The process of determining the unidirectional knowledge synergy loss value of the KSP loss function includes:

calculating the unidirectional knowledge synergy loss value by using the classification-layer output feature of each sample in each homogeneous branch and the KSP loss function, where the KSP loss function is:

$$L_{ksp} = \min_{\theta} \frac{1}{N} \sum_{n=1}^{N} \sum_{\substack{(u,v) \in \mathbb{Z} \\ u \neq v}} \sum_{k=1}^{K} f_c^k(x_n, \theta^u) \log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ with homogeneous branch, $\mathbb{Z}$ represents an optional space formed by any two homogeneous branches, K represents a dimension of the classification-layer output feature, $x_n$ represents an $n^{th}$ sample, $f_c^k(x_n,\theta^u)$ represents a classification-layer output feature of $x_n$ in the $k^{th}$ dimension in the $u^{th}$ homogeneous branch, $f_c^k(x_n,\theta^v)$ represents a classification-layer output feature of $x_n$ in the $k^{th}$ dimension in the $v^{th}$ homogeneous branch, $\theta^u$ represents a network parameter of the $u^{th}$ homogeneous branch, and $\theta^v$ represents a network parameter of the $v^{th}$ homogeneous branch.

In some embodiments of the present application, the determining a homogeneous training network corresponding to an initial person re-identification network includes:

deriving an auxiliary training branch from an intermediate layer of the initial person re-identification network to generate a homogeneous training network with an asymmetric network structure.

In some embodiments of the present application, the determining a homogeneous training network corresponding to an initial person re-identification network includes:

deriving an auxiliary training branch from an intermediate layer of the initial person re-identification network to generate a homogeneous training network with a symmetric network structure.

In some embodiments of the present application, the process of determining the triplet loss value of the triplet loss function includes:

determining a first loss value of each homogeneous branch according to an embedding-layer output feature of each sample in each homogeneous branch and a first triple loss function; and selecting a first loss value that is numerically minimum from each homogeneous branch as the triplet loss value. The first triplet loss function is:

$$L_{TriHard}^b = -\frac{1}{N}\sum_{a=1}^{N}\left[\max_{y_p=y_a} d(f_e^a, f_e^p) - \min_{y_q \neq y_a} d(f_e^a, f_e^q) + m\right]_+,$$

where $L_{TriHard}^b$ represents a first loss value of a $b^{th}$ homogeneous branch, N represents a total quantity of the training samples, a represents an anchor sample, $f_e^a$ represents an embedding-layer output feature of the anchor sample, y represents a classification tag of the sample, p represents a sample that belongs to a same classification tag as the anchor sample and that is at a maximum intra-class distance from the anchor sample, $f_e^p$ represents an embedding-layer output feature of the sample p, q represents a sample that belongs to a different classification tag from the anchor sample and that is at a minimum inter-class distance from the anchor sample, $f_e^u$ represents an embedding-layer output feature of the sample q, m represents a first parameter, $d(\cdot,\cdot)$ is used for calculating a distance, $[\cdot]_+$ and max $d(\cdot,\cdot)$ both represent calculation of a maximum distance, min $d(\cdot,\cdot)$ represents calculation of a minimum distance, $y_a$ represents a classification tag of the anchor sample, $y_p$ represents a classification tag of the sample p, and $y_q$ represents a classification tag of the sample q.

In some embodiments of the present application, after the determining a first loss value of each homogeneous branch, the method further includes:

determining a second loss value of each homogeneous branch by using the first loss value of each homogeneous branch and a second triplet loss function. The second triplet loss function is:

$$L_{E\_TriHard}^b = L_{TriHard}^b + \beta \frac{1}{N}\sum_{a=1}^{N}\left(\frac{d(f_e^a, f_e^p)}{d(f_e^a, f_e^q)}\right),$$

where $L_{E\_TriHard}^b$ represents a second loss value of the b th homogeneous branch, and β represents a second parameter.

Correspondingly, the selecting a first loss value that is numerically minimum from each homogeneous branch as the triplet loss value includes:

selecting the second loss value that is numerically minimum from each homogeneous branch as the triplet loss value.

In order to achieve the foregoing objective, the present application further provides a person Re-ID apparatus. The apparatus includes:

a network determining module, configured to determine a homogeneous training network corresponding to an initial person Re-ID network, where the homogeneous training network includes a plurality of homogeneous branches with a same network structure;

a parameter determining module, configured to train the homogeneous training network by using a target loss function, and determine a final weight parameter of each network layer in the homogeneous training network, where the target loss function includes a KSP loss function, and the KSP loss function is used to determine a unidirectional knowledge synergy loss value between the homogeneous branches by using classification-layer output features of each training sample in every two homogeneous branches;

a parameter loading module, configured to load the final weight parameter by using the initial person Re-ID network to obtain a final person Re-ID network; and a person Re-ID module, configured to perform a person Re-ID task by using the final person Re-ID network.

The parameter determining module includes:

a loss value determining unit, configured, during training of the homogeneous training network, to determine a cross-entropy loss value of a cross-entropy loss function, determine a triplet loss value of a triplet loss function, and determine the unidirectional knowledge synergy loss value of the KSP loss function; and a weight determining unit, configured to determine the final weight parameter of each network layer in the homogeneous training network by using a total loss value of the cross-entropy loss value, the triplet loss value, and the unidirectional knowledge synergy loss value.

The loss value determining unit includes:

a calculation subunit, configured to calculate the unidirectional knowledge synergy loss value by using the classification-layer output feature of each sample in each homogeneous branch and the KSP loss function, where the KSP loss function is:

$$L_{ksp} = \min_{\theta} \frac{1}{N}\sum_{n=1}^{N}\sum_{\substack{(u,v)\in \mathbb{Z} \\ u \neq v}}\sum_{k=1}^{K} f_c^k(x_n, \theta^u)\log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ with homogeneous branch, $\mathbb{Z}$ represents an optional space formed by any two homogeneous branches, K represents a dimension of the classification-layer output feature, $x_n$ represents an $n^{th}$ sample, $f_c^k(x_n,\theta^u)$ represents a classification-layer output feature of $x_n$ in the $k^{th}$ dimension in the $u^{th}$ homogeneous branch, $f_c^k(x_n,\theta^v)$ represents a classification-layer output feature of $x_n$ in the $k^{th}$ dimension in the $v^{th}$ homogeneous branch, $\theta^u$ represents a network parameter of the $u^{th}$ homogeneous branch, and $\theta^v$ represents a network parameter of the $v^{th}$ homogeneous branch.

In some embodiments, the loss value determining unit includes:

a first determining subunit, configured to determine a first loss value of each homogeneous branch according to an embedding-layer output feature of each sample in each homogeneous branch and a first triple loss function; and a selecting subunit, configured to select a first loss value that is numerically minimum from each homogeneous branch as the triplet loss value;

where the first triplet loss function is:

$$L_{TriHard}^b = -\frac{1}{N}\sum_{a=1}^{N}\left[\max_{y_p=y_a} d(f_e^a, f_e^p) - \min_{y_q \neq y_a} d(f_e^a, f_e^q) + m\right]_+,$$

where $L_{TriHard}^b$ represents a first loss value of a $b^{th}$ homogeneous branch, N represents a total quantity of the training samples, a represents an anchor sample, $f_e^a$ represents an embedding-layer output feature of the anchor sample, y represents a classification tag of the sample, p represents a sample that belongs to a same classification tag as the anchor sample and that is at a maximum intra-class distance from the anchor sample, $f_e^p$ represents an embedding-layer output feature of the sample p, q represents a sample that belongs to a different classification tag from the anchor sample and that is at a minimum inter-class distance from the anchor sample, $f_e^q$ represents an embedding-layer output feature of the sample q, m represents a first parameter, d(·,·) is used for calculating a distance, [·]$_+$ and max d(·,·) both represent calculation of a maximum distance, min d(·,·) represents calculation of a minimum distance, $y_a$ represents a classification tag of the anchor sample, $y_p$ represents a classification tag of the sample p, and $y_q$ represents a classification tag of the sample q.

In some embodiments, the loss value determining unit further includes:

a second determining subunit, configured to determine a second loss value of each homogeneous branch by using the first loss value of each homogeneous branch and a second triplet loss function, where the second triplet loss function is:

$$L_{E\_TriHard}^b = L_{TriHard}^b + \beta \frac{1}{N} \sum_{a=1}^{N} \left( \frac{d(f_e^a, f_e^p)}{d(f_e^a, f_e^q)} \right),$$

where $L_{E\_TriHard}^b$ represents a second loss value of the b th homogeneous branch, and β represents a second parameter; and correspondingly, the selecting subunit is used for: selecting the second loss value that is numerically minimum from each homogeneous branch as the triplet loss value.

In order to achieve the foregoing objective, the present application further provides an electronic device, including:

a memory, configured to store a computer program; and a processor, configured to execute the computer program to implement the operations of the person Re-ID method.

In order to achieve the foregoing objective, the present application further provides a computer-readable storage medium. The computer-readable storage medium stores a computer program. The computer program is executed by a processor to implement the operations of the person Re-ID method.

It can be seen from the foregoing solutions that embodiments of the present application provide the person Re-ID method and apparatus, the device, and the readable storage medium. In the present solution, before a person Re-ID task is performed, it is necessary to first build the homogeneous training network of the initial person Re-ID network. Since the homogeneous training network includes a plurality of homogeneous branches with the same network structure, in the present solution, feature information between the homogeneous branches may be mined during training, to implement mutual regularization of the homogeneous branches to improve accuracy of each homogeneous branch. Moreover, in the present solution, the homogeneous training network is trained by using the KSP loss function, so that information interaction of different layers between the homogeneous branches may be implemented during training, the plurality of homogeneous branches provide different perspectives on the same data, and realize mutual regularization between branches through knowledge synergy between different perspectives, thus improving the accuracy of the network. Therefore, in the present solution, after the homogeneous training network is trained through the foregoing operations to obtain a more accurate final weight parameter, the initial person Re-ID network may load the final weight parameter to perform the person Re-ID task. Therefore, the accuracy and performance of the person Re-ID network in processing the person Re-ID task are improved, occupation of storage space in the device is reduced, storage and deployment of the portable device are facilitated better, a calculation amount for performing the person Re-ID task is reduced, and processing speed of the person Re-ID task is accelerated. Moreover, in the present solution, only a network training process is required to be changed, and complex processing is not performed on the network in a network application process. Therefore, in the present solution, a potential of the network may be mined maximally without increasing any parameter quantity and calculation amount, and the network performance may be improved.

BRIEF DESCRIPTION OF THE DRAWINGS

In order to describe the technical solutions in the embodiments of the present application or the related art more clearly, the drawings required to be used in descriptions about the embodiments or the related art will be introduced briefly below. Apparently, the drawings in the description below are merely some embodiments of the present application. A person ordinarily skilled in the art may further obtain other drawings according to these drawings without creative work.

DETAILED DESCRIPTION

In related art, improving network performance by deepening or widening of a network has the following shortcomings.

1: A deeper, wider or more complex network generally brings a sharp increase of a parameter quantity, and the increase of the parameter quantity is unfavorable for storage and deployment of a portable device. For example, deployment of a real-time person detection and recognition program in a web camera requires a network to have a small parameter quantity (convenient for storage) and high recognition accuracy.

2: The deeper, wider or more complex network generally brings an increase of a calculation amount, which is unfavorable for application in a scenario with a high requirement for real-time performance. For example, for searching and tracking of a criminal suspect, a long calculation delay may cause the best time to be lost for an entire system, and bring adverse impact on a system function.

Therefore, how to improve the accuracy and performance of the person Re-ID networks in handling person Re-ID tasks, reduce the storage space occupied by device storage of the person Re-ID networks, facilitate the storage and deployment of portable devices, reduce the calculation amount of executing the person Re-ID tasks, and improve the processing speed of the person Re-ID tasks, is a technical problem that a person skilled in the art needs to solve.

In the present application, it is found that a plurality of viewpoints for the same data may provide additional regularized information, thereby improving accuracy of the network. That is, a plurality results for a same image may assist one another, thereby obtaining a more accurate result by using swarm intelligence. The plurality of results include not only a final result but also an intermediate result. Based on this, the present application discloses a person Re-ID method and apparatus, a device, and a readable storage medium. In the present solution, with introduction of a knowledge synergy method, a training process may be optimized without increasing an additional parameter quantity and a calculation amount of the network to mine a potential of a network and improve accuracy and performance of the network to achieve optimal performance of the network, thereby presenting a better result in an application process of the network. In the present application, knowledge is defined as a feature map in the network.

The technical solutions in the embodiments of the present application will be described clearly and completely below with reference to the accompanying drawings in the embodiments of the present application. Clearly, the described embodiments are not all but merely some embodiments of the present application. All other embodiments obtained by a person ordinarily skilled in the art based on the embodiments of the present application without creative work shall fall within the protection scope of the present application.

Figure 1:
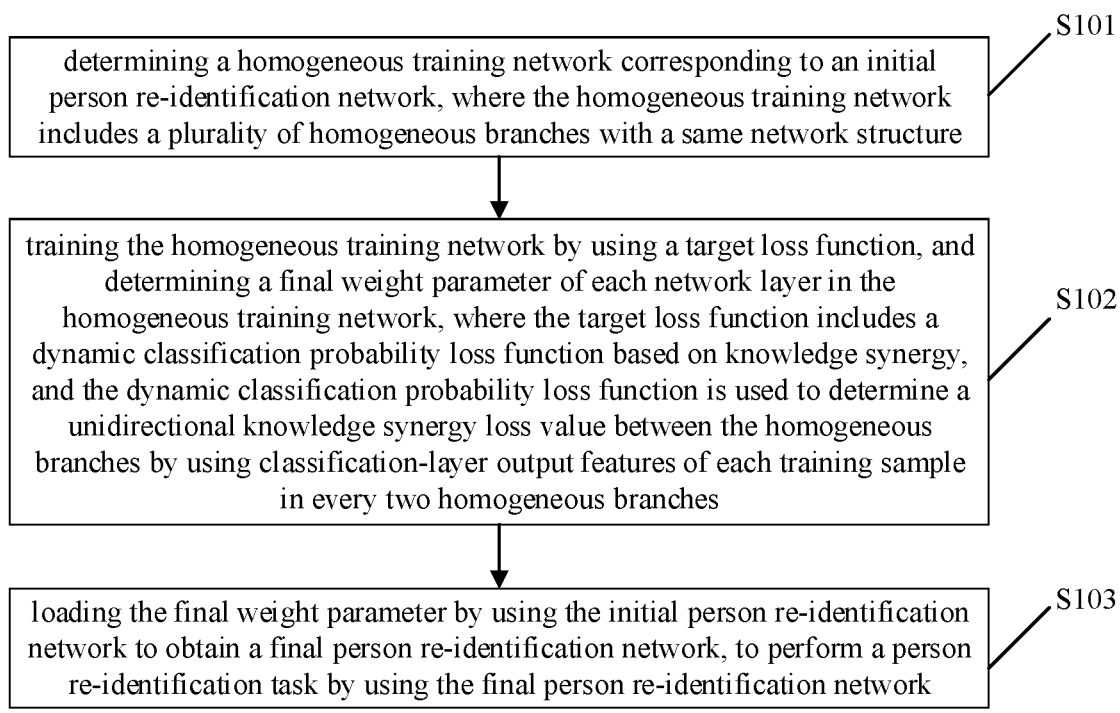
FIG. 1 is a schematic flow chart of a person Re-ID method according to an embodiment of the present application.

FIG. 1 is a schematic flow chart of a person Re-ID method according to an embodiment of the present application. It can be seen from FIG. 1 that the method includes the following steps.

In S101, determining a homogeneous training network corresponding to an initial person Re-ID network, where the homogeneous training network includes a plurality of homogeneous branches with a same network structure.

It should be noted that in the present embodiment, the initial person Re-ID network is an untrained original deep learning network. Moreover, in the present embodiment, a specific network structure of the initial person Re-ID network is not limited as long as the person Re-ID operation may be performed after the initial person Re-ID network is trained. Moreover, the solution may be applied in a plurality of fields such as image classification, segmentation, and retrieval. In the embodiment, the specific application field of person Re-ID is only used as an example to explain the solution in detail.

Figure 2A:
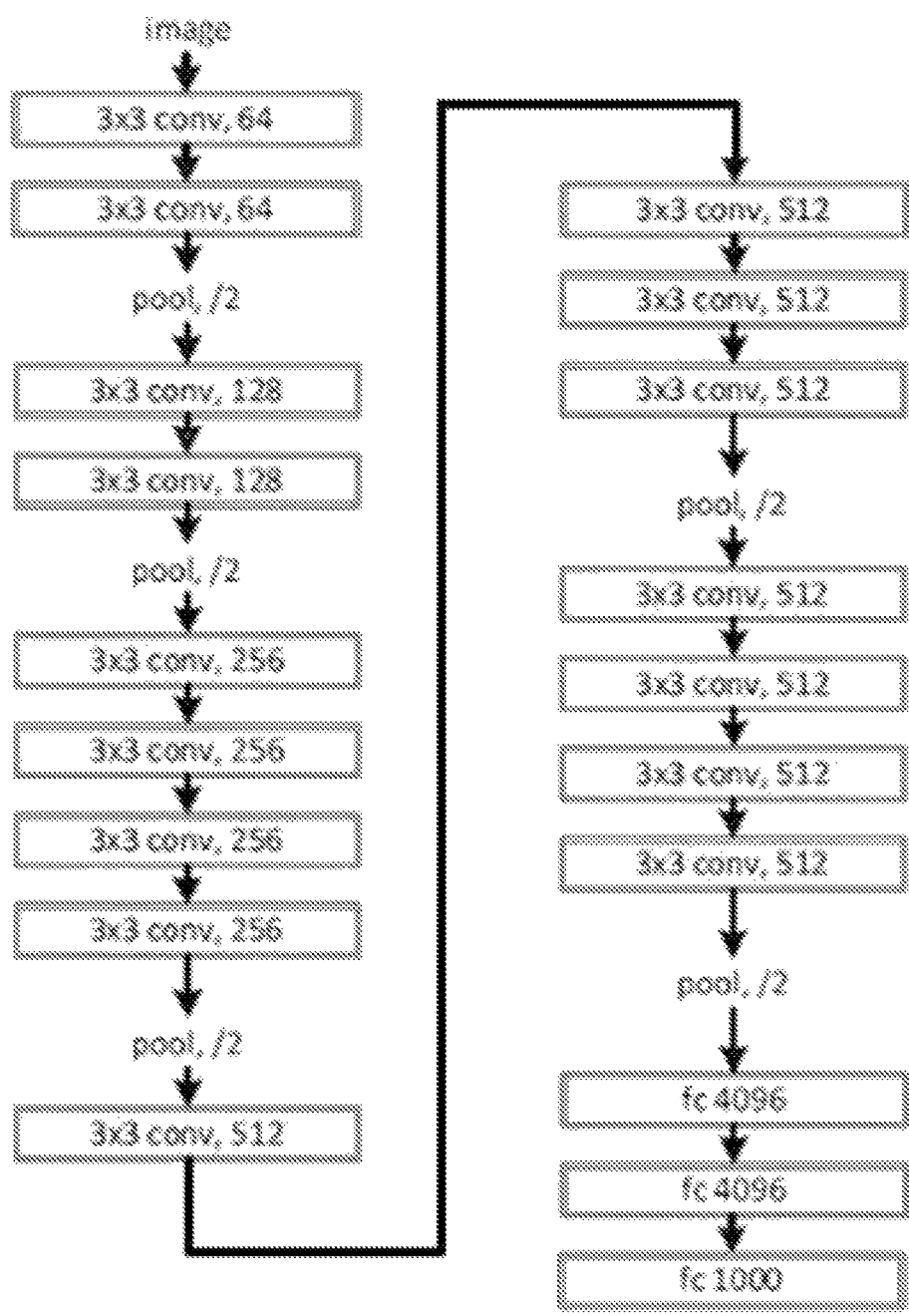
FIG. 2a is a schematic diagram of a network structure according to an embodiment of the present application.
Figure 2B:
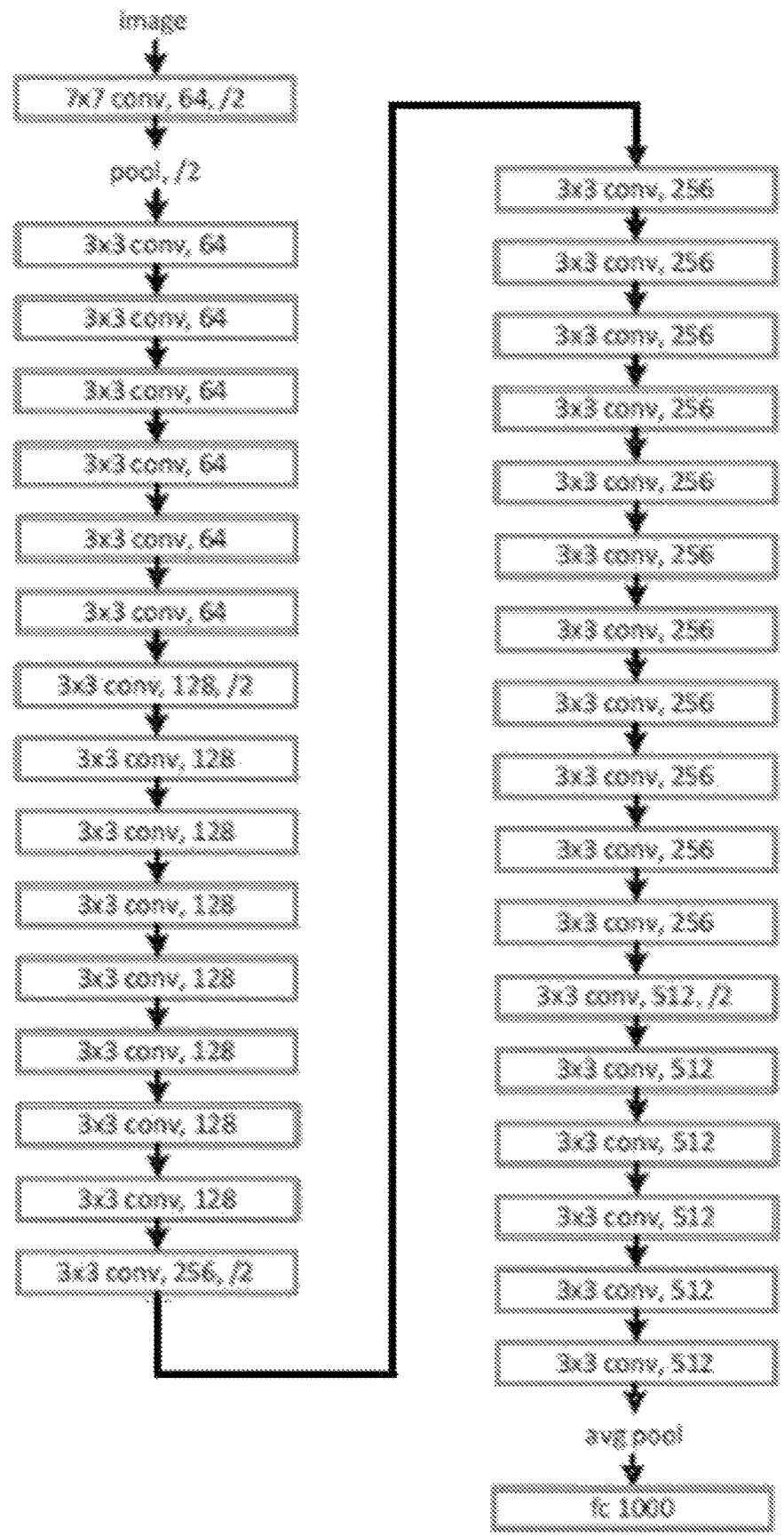
FIG. 2b is a schematic diagram of another network structure according to an embodiment of the present application.
Figure 2C:
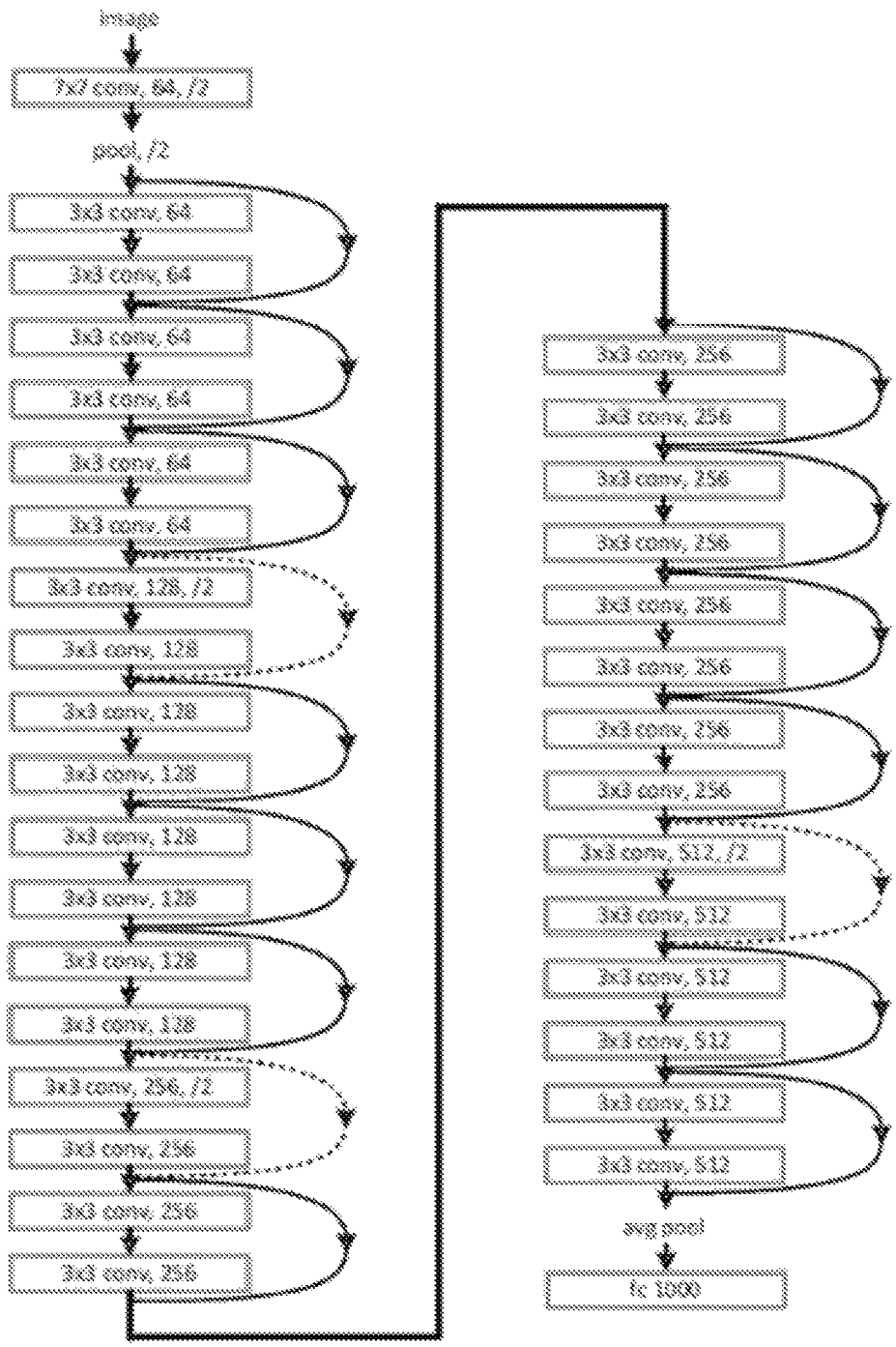
FIG. 2c is a schematic diagram of yet another network structure according to an embodiment of the present application.
Figure 3A:
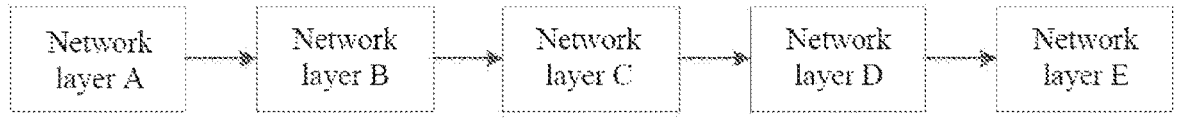
FIG. 3a is a schematic diagram of a structure of an initial person Re-ID network according to an embodiment of the present application.

In the present embodiment, after the initial person Re-ID network is obtained, the initial person Re-ID network may be reconstructed to obtain the corresponding homogeneous training network. In some embodiments, a convolutional neural network is generally of a deep structure including a plurality of layers of networks that are stacked. FIG. 2a, FIG. 2b, and FIG. 2c are schematic diagrams of three different network structures according to an embodiment of the present application. FIG. 2a represents a 34-layer Residual Network (ResNet) including a shortcut connection. FIG. 2b represents a 34-layer plain network. FIG. 2c represents a 19-layer Visual Geometry Group (VGG) network. The above networks are all of a multilayer stacked structure. The network of a single branch is referred to as a backbone network in the present solution. In order to describe the homogeneous training network in the present solution clearly, FIG. 3a is a schematic diagram of a structure of the initial person Re-ID network according to an embodiment of the present application. It can be seen from FIG. 3a that in the present embodiment, an example in which the initial person Re-ID network includes five layers, that is, network layer A to network layer E, is used for description. Network layer A to network layer E form a backbone network.

Figure 3B:
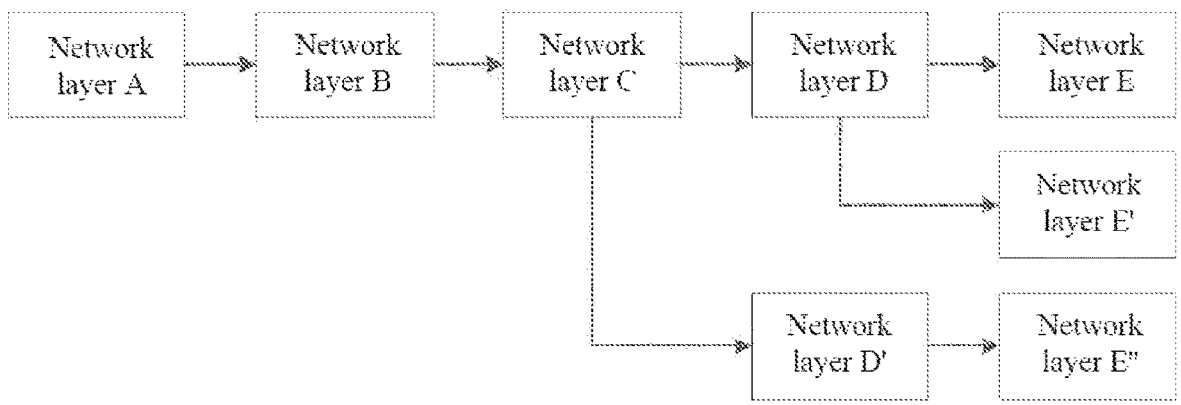
FIG. 3b is a schematic diagram of a homogeneous training network with an asymmetric network structure according to an embodiment of the present application.
Figure 3C:
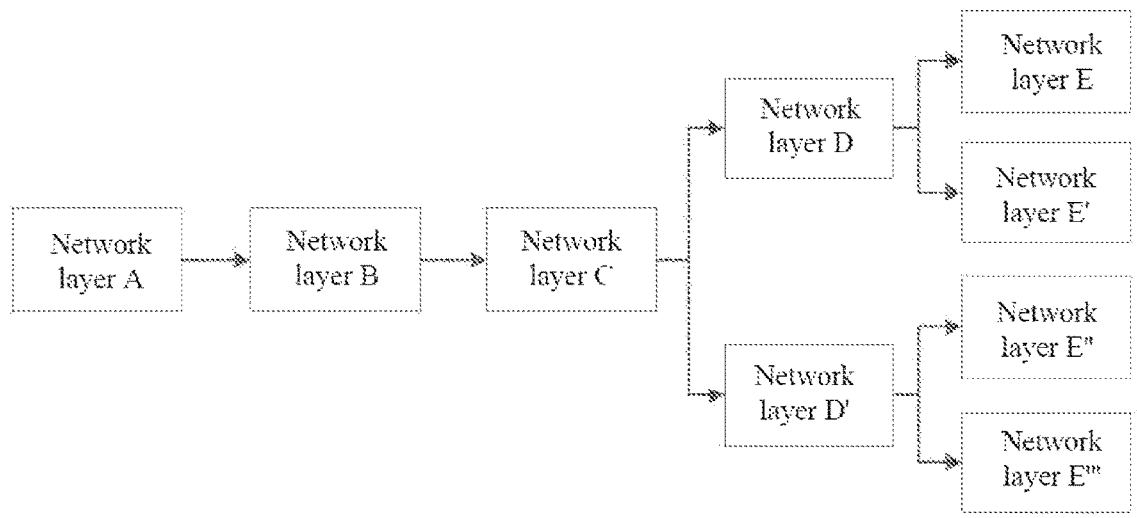
FIG. 3c is a schematic diagram of a homogeneous training network with a symmetric network structure according to an embodiment of the present application.

Moreover, in the present solution, when the homogeneous training network corresponding to the initial person Re-ID network is created, an auxiliary training branch may be derived from an intermediate layer of the initial person re-identification network to generate a homogeneous training network with an asymmetric network structure or generate a homogeneous training network with a symmetric network structure. FIG. 3b is a schematic diagram of the homogeneous training network with the asymmetric network structure according to an embodiment of the present application. FIG. 3c is a schematic diagram of the homogeneous training network with the symmetric network structure according to an embodiment of the present application. It can be seen from FIG. 3b and FIG. 3c that in the present embodiment, intermediate layers of the backbone network from which auxiliary training branches are derived are network layer C and network layer D. Moreover, the auxiliary training branch derived from network layer C in FIG. 3b is network layer D'-network layer E", and the auxiliary training branch derived from network layer D in FIG. 3b is network layer E'. Network layer D' is of a same structure as network layer D. Network layer E' and network layer E" are of a same structure as network layer E. Therefore, the homogeneous training network of the asymmetric network structure generated in the present embodiment has totally three homogeneous branches of the same network structure, which are respectively:

1: network layer A-network layer B-network layer C-network layer D-network layer E;

2: network layer A-network layer B-network layer C-network layer D-network layer E'; and 3: network layer A-network layer B-network layer C-network layer D'-network layer E".

Further, the auxiliary training branches derived from network layer C in FIG. 3c are network layer D'-network layer E" and network layer D'-network layer E''', and the auxiliary training branch derived from network layer D is network layer E'. Network layer D' is of a same structure as network layer D. Network layer E', network layer E", and network layer E'" are of a same structure as network layer E. Therefore, the homogeneous training network of the symmetric network structure generated in the present embodiment has totally four homogeneous branches of the same network structure, which are respectively:

1: network layer A-network layer B-network layer C-network layer D-network layer E;

2: network layer A-network layer B-network layer C-network layer D-network layer E';

3: network layer A-network layer B-network layer C-network layer D'-network layer E"; and 4: network layer A-network layer B-network layer C-network layer D'-network layer E'".

It can be seen that in the present embodiment, since the network structure of the network layer in the derived auxiliary training branch is the same as that of the corresponding network layer in the backbone network, it indicates that the finally generated homogeneous training network includes the plurality of homogeneous branches with the same network structure. In addition, in the present solution, when the auxiliary training branch is derived from the intermediate layer of the backbone network, a specific intermediate layer of the network from which the auxiliary training branch is derived is not limited, and may be set according to an actual situation. Moreover, in the present embodiment, after the auxiliary training branch is derived, an auxiliary-derivation-based homogeneous training network of the asymmetric network structure (as shown in FIG. 3b) or a hierarchy-derivation-based homogeneous training network of the asymmetric network structure (as shown in FIG. 3c) may be generated. In actual applications, a specific type of the homogeneous training network may be customized according to a resource condition. For example, when a hardware device has high calculation performance, the homogeneous training network of the symmetric network structure may be generated; or when a hardware device has average calculation performance, the homogeneous training network of the asymmetric network structure may be generated.

It may be understood that in current deep learning networks, structures based on a heterogeneous auxiliary classification network are quite common, for example, Google-Net. The heterogeneous auxiliary classification network means that an auxiliary classification branch is derived from a backbone network, but a network structure of the auxiliary classification branch is quite different from that of the backbone network. Therefore, a design based on a heterogeneous auxiliary branch requires rich experience. Simple introduction of heterogeneous branches to some positions of a network layer may not improve network performance. In addition, a heterogeneous branch network is of a different structure from a main branch network, and is also required to be designed separately. Compared with a heterogeneous-network-based auxiliary training branch, the homogeneous-network-based auxiliary training branch disclosed in the present application has at least the following advantages.

(1) The network structure of the homogeneous auxiliary training branch is the same as that of the backbone network, and is not required to be designed separately, so that a network design is simple.

(2) The homogeneous auxiliary training branch has a natural branch similarity, that is, each auxiliary training branch is the same in structure and input but different in initial weight value, and each branch provides its own viewpoint for input data. Feature information between the auxiliary branches may be mined to implement mutual regularization of the branches, thereby promoting development of each branch to higher accuracy.

In S102, training the homogeneous training network by using a target loss function, and determining a final weight parameter of each network layer in the homogeneous training network, where the target loss function includes a KSP loss function, and the KSP loss function is used to determine a unidirectional knowledge synergy loss value between the homogeneous branches by using classification-layer output features of each training sample in every two homogeneous branches.

In S103, loading the final weight parameter by using the initial person Re-ID network to obtain a final person Re-ID network, to perform a person Re-ID task by using the final person Re-ID network.

In the present embodiment, after the homogeneous training network corresponding to the initial person Re-ID network is created, the homogeneous training network is required to be trained to be converged by using the target loss function, to obtain the trained final weight parameter of the network after convergence. When the person Re-ID task is performed, the trained final weight parameter of the network is pre-loaded to finally classify the input data. It should be noted that in the present embodiment, the homogeneous training network may be trained by using a current general network training process, thereby obtaining the final weight parameter. During training, the used loss function may include a cross-entropy loss function, a triplet loss function, and the like. Moreover, since the homogeneous training network in the present embodiment includes the plurality of homogeneous branches of the same network structure, in the present solution, the KSP loss function is proposed based on the special structure of the homogeneous training network. Training the homogeneous training network by using the KSP loss function may make a probability distribution of final prediction results of the homogeneous branches similar by mutual imitative learning. At the same time, by strengthening information exchange between branches, the backbone network may improve its generalization ability by supporting the convergence of a plurality of branch networks simultaneously, thereby further improving network performance.

The present embodiment provides a training process for the homogeneous training network, including the following steps.

In a first step, selecting a proper derivation position from the backbone network according to the network structure of the initial person Re-ID network, thereby determining the intermediate layer from which the auxiliary training branch is derived, and constructing the homogeneous-network-based auxiliary training branch to obtain the homogeneous training network.

In a second step, determining the target loss function, and calculating a loss of each homogeneous branch in the homogeneous training network by using the target loss function. The loss corresponds to the target loss function. In response to the target loss function including the cross-entropy loss function, the triplet loss function, and a knowledge synergy for embedding distance (KSE) loss function, the obtained loss of the homogeneous branch includes the cross-entropy loss value, the triplet loss value, and the KSE loss value.

In a third step, training the network according to the foregoing target loss function to converge the network.

In a fourth step, storing a trained weight parameter.

In some embodiments, the current network training process generally includes the following two phases. The first phase is a phase in which data is propagated from a lower layer to a higher layer, that is, a forward propagation phase. The other phase is a phase in which an error is propagated for training from the higher layer to the lower layer when a result obtained by forward propagation is inconsistent with what is expected, that is, a back propagation phase. A specific training process is as follows.

In step 1, initializing a weight of the network layer. Random initialization is generally used.

In step 2, performing forward propagation on input training image data through each network layer such as a convolutional layer, a down-sampling layer, and a Fully Connected (FC) layer, to obtain an output value.

In step 3, calculating an error between the output value of the network and a target value (tag). The error is calculated by calculating the output value of the network and obtaining a total loss value based on the target loss function.

In step 4, back propagating the error to the network, and sequentially calculating a back propagation error of each network layer such as the FC layer and the convolutional layer.

In step 5, adjusting, by each network layer, all weight coefficients in the network according to the back propagation error of each layer, that is, updates the weights.

In step 6, reselecting randomly new training image data, and then performing step 2 to perform forward propagation to obtain an output value of the network.

In step 7, repeating infinitely iteration, and ending the training when an error between the output value of the network and the target value (tag) is less than a specific threshold or a quantity of iterations exceeds a specific threshold.

In step 8, storing trained network parameters of all the layers.

After the network is trained through the foregoing process, the final weight parameter of each network layer in the homogeneous training network may be obtained. When the network performs the person Re-ID task, all auxiliary training branches are required to be removed, and then the final weight parameters is loaded for person Re-ID. That is, in the present embodiment, the final weight parameter is loaded by using the initial person Re-ID network without the auxiliary training branches to obtain the final person Re-ID network, and the person Re-ID task is performed by using the final person Re-ID network. It should be noted that the initial person Re-ID network includes only the backbone network but no auxiliary training branches, and the weight parameter obtained by training the homogeneous training network includes a weight parameter of the backbone network and a weight parameter of the auxiliary training branch. Therefore, when the final weight parameter is loaded by using the initial person Re-ID network, only the weight parameter of the backbone is loaded.

In summary, it can be seen that in the present solution, before a person Re-ID task is performed, it is necessary to first build the homogeneous training network of the initial person Re-ID network. Since the homogeneous training network includes a plurality of homogeneous branches with the same network structure, in the present solution, feature information between the homogeneous branches may be mined during training, to implement mutual regularization of the homogeneous branches to improve accuracy of each homogeneous branch. Moreover, in the present solution, the homogeneous training network is trained by using the KSP loss function, so that information interaction of different layers between the homogeneous branches may be implemented during training, the plurality of homogeneous branches provide different perspectives on the same data, and realize mutual regularization between branches through knowledge synergy between different perspectives, thus improving the accuracy of the network. Therefore, in the present solution, after the homogeneous training network is trained through the foregoing operations to obtain a more accurate final weight parameter, the initial person Re-ID network may load the final weight parameter to perform the person Re-ID task, thus improving the performance of the network. Moreover, in the present solution, only a network training process is required to be changed, and complex processing is not performed on the person Re-ID network in a network identification process. Therefore, in the present solution, a potential of the network may be mined maximally without increasing any parameter quantity and calculation amount, and the network performance may be improved. Further, in the present application, when the final person Re-ID network performs the person Re-ID task, occupation of additional storage space due to a large parameter quantity of the final person Re-ID network may be avoided, thereby reducing occupation of storage space. Therefore, the final person Re-ID network may be deployed in the portable device, and the portable device runs the final person Re-ID network to perform the person Re-ID task. Moreover, when the final person Re-ID network performs the person Re-ID task, an additional calculation amount is avoided. Therefore, in the present application, the final person Re-ID network may perform a highly real-time person Re-ID task, and the accuracy and the execution speed of the person Re-ID task are improved.

Based on the foregoing embodiment, in the present embodiment, the step of training the homogeneous training network by using a target loss function, and determining a final weight parameter of each network layer in the homogeneous training network includes that:

during training of the homogeneous training network, determining the cross-entropy loss value of the cross-entropy loss function, determining the triplet loss value of the triplet loss function, and determining a the unidirectional knowledge synergy loss value of the KSP loss function; and determining the final weight parameter of each network layer in the homogeneous training network by using a total loss value of the cross-entropy loss value, the triplet loss value, and the unidirectional knowledge synergy loss value.

Figure 4:
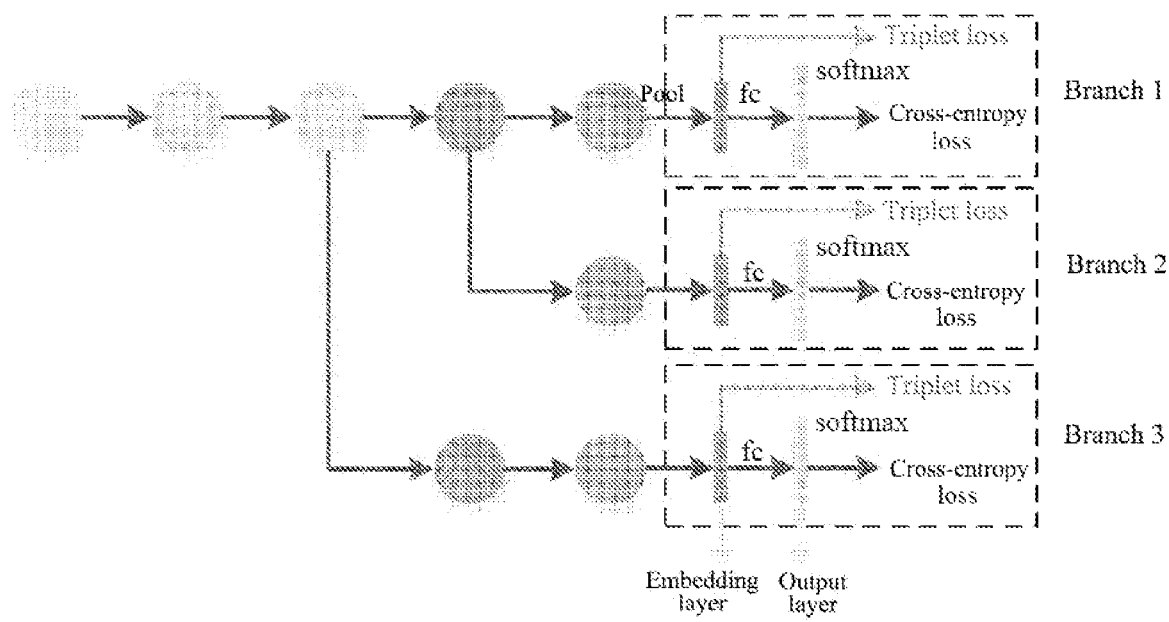
FIG. 4 is a schematic diagram of a homogeneous training network according to an embodiment of the present application.
Figure 5:
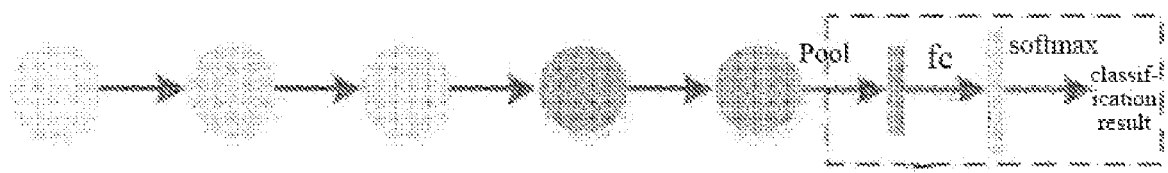
FIG. 5 is a schematic diagram of a structure of a final person Re-ID network according to an embodiment of the present application.

That is, in the present embodiment, the network is trained mainly based on the cross-entropy loss function, the triplet loss function, and the KSP loss function. Each loss function is described herein. FIG. 4 is a schematic diagram of the homogeneous training network according to an embodiment of the present application. It can be seen from FIG. 4 that the homogeneous training network is of the asymmetric network structure. Two auxiliary training branches are derived based on the original backbone network. Currently, there are totally three homogeneous branches: branch 1, branch 2, and branch 3. After the homogeneous training network is trained to obtain the final weight parameter, the auxiliary training branch is removed, and the original backbone network is retained. FIG. 5 is a schematic diagram of a structure of the final person Re-ID network according to an embodiment of the present application. After the weight parameter obtained by training is loaded by using the network shown in FIG. 5, the person Re-ID task may be performed.

In the present embodiment, a cross-entropy loss function of each branch is calculated first by using the following formula:

$$\min_{\theta} \sum_{b=1}^{B} \alpha^b L_c^b(x, y, \theta^b) \qquad (1)$$

$$L_c^b(x, y, \theta^b) = -\frac{1}{N} \sum_{n=1}^{N} \sum_{k=1}^{K} y_n^k \log(f_c^k(x_n, \theta^b)) \qquad (2)$$

Among them, a network input is represented as $D_T=\{(x_n, y_n)|n \in [1, N]\}$. N represents a total quantity of sample images. $x_n$ represents an $n^{th}$ image. $y_n$ represents a classification tag corresponding to this image. $f_c(x_n, \theta^b)$ represents an output feature of a network model, and the subscript c represents obtaining a classification-layer feature of the network after passing through a softmax layer. As shown in FIG. 4, the cross-entropy loss function is calculated to obtain the classification-layer output feature $f_c(\cdot)$ of the network. K represents a dimension of a classification-layer feature vector output by the network. B represents a quantity of the plurality of homogeneous branches. $L_c^b(x,y,\theta^b)$ represents a cross-entropy loss function of a $b^{th}$ homogeneous branch. $\theta^b$ represents a network parameter of the $b^{th}$ homogeneous branch. $\alpha^b \in (0,1]$ is a hyperparameter representing a weight of the cross-entropy loss of each branch. By using the foregoing formula, the cross-entropy loss of each homogeneous branch of an input image is calculated for weighted summation.

Further, the process of determining the triplet loss value of the triplet loss function in the present embodiment includes:

determining a first loss value of each homogeneous branch according to the embedding-layer output feature of each sample in each homogeneous branch and a first triple loss function; and selecting a first loss value that is numerically minimum from each homogeneous branch as the triplet loss value.

The first triplet loss function is:

$$L_{TriHard}^b = \frac{1}{N} \sum_{a=1}^{N} \left[ \max_{y_p = y_a} d(f_e^a, f_e^p) - \min_{y_q \neq y_a} d(f_e^a, f_e^q) + m \right]_+$$

where $L_{TriHard}^b$ represents a first loss value of a $b^{th}$ homogeneous branch, N represents a total quantity of training samples, a represents an anchor sample, $f_e^a$ represents an embedding-layer output feature of the anchor sample, y represents a classification tag of the sample, p represents a sample that belongs to a same classification tag as the anchor sample and that is at a maximum intra-class distance from the anchor sample, $f_e^p$ represents an embedding-layer output feature of the sample p, q represents a sample that belongs to a different classification tag from the anchor sample and that is at a minimum inter-class distance from the anchor sample, $f_e^q$ represents an embedding-layer output feature of the sample q, m represents a first parameter, $d(\cdot,\cdot)$ is used for calculating a distance, $[\cdot]_+$ and .max $d(\cdot,\cdot)$ both represent calculation of a maximum distance, min $d(\cdot,\cdot)$ represents calculation of a minimum distance, $y_a$ represents a classification tag of the anchor sample, $y_p$ represents a classification tag of the sample p, and $y_q$ represents a classification tag of the sample q.

In some embodiments, the triplet loss function mines hard samples in the input data to calculate a maximum intra-class distance and a minimum inter-class distance in triplet data, and the distances are constrained in the loss function to make the maximum intra-class distance as short as possible and the minimum inter-class distance as long as possible. In this way, distances between samples of different classes in a feature (feature obtained after calculation based on the deep learning network) space to which the samples are mapped are increased, and samples of the same class are aggregated maximally. Therefore, identification accuracy is improved. The formula 3 is the triplet loss function provided in the present embodiment. $d(\cdot,\cdot)$ represents calculation of a distance between vectors. A Euclidean distance, a cosine distance, or the like may be used. In the formula 3, a in $f_e^a = f(x_a, \theta^b)$ represents anchor, that is, an anchor sample. $f_e(\cdot)$ represents obtaining a feature of the image in an embedding layer of the network. That is, in the present embodiment, all samples in each batch are required to be traversed. The traversed sample is referred to as an anchor sample. A maximum intra-class distance and a minimum inter-class distance of anchor sample features are calculated and put into the formula 3. $f^p$ represents an image feature of the same class as the anchor sample. $f^q$ represents an image feature of a different class from the anchor sample. It should be noted that $f_e^a$, $f_e^p$, $f_e^q$ in the present embodiment are features in the embedding layer of the network.

Further, the first triplet loss function shown by the formula 3 may increase distances between samples of different classes and maximally aggregate samples of the same class, thereby improving the identification accuracy. However, the first triplet loss function considers only a difference between an intra-class difference and an inter-class difference of the sample, and ignores an absolute distance (that is, an absolute value) of the intra-class difference. When the absolute value of the intra-class difference is further limited, the samples of the same class may further be aggregated maximally, thereby further improving the identification accuracy. Therefore, in the present embodiment, after determining the first loss value of each homogeneous branch, the method further includes that:

determining a second loss value of each homogeneous branch by using the first loss value of each homogeneous branch and a second triplet loss function, where the second triplet loss function is:

$$L_{E\_TriHard}^b = L_{TriHard}^b + \beta \frac{1}{N} \sum_{a=1}^{N} \left( \frac{d(f_e^a, f_e^p)}{d(f_e^a, f_e^q)} \right), \qquad (4)$$

where $L_{TriHard}^b$ represents the first loss value of the $b^{th}$ homogeneous branch, $L_{E\_Trihard}^b$ represents the second loss value of the $b^{th}$ homogeneous branch, and $\beta$ represents a second parameter. The above constraint may make $d(f_e^a, f_e^p)$ smaller and $d(f_e^a, f_e^q)$ greater. That is, the absolute value of the intra-class difference is constrained. Correspondingly, after the second loss value is calculated, a total loss function may be obtained as formula 5 according to the cross-entropy loss calculated by using the formula 2 and the triplet loss calculated by using the formula 4. In the formula, $\gamma$ represents a hyperparameter, and may be trained or preset.

$$L = \min_{\theta} \sum_{b=1}^{B} \left( \alpha^b L_c^b(x, y, \theta^b) + \gamma^b L_{E\_TriHard}^b \right). \qquad (5)$$

Based on the above content, the present embodiment provides a specific process in which the loss value is calculated by using the cross-entropy loss function and the triplet loss function.

In step (1), all samples in each batch are traversed. As described above, it is assumed that each batch includes N samples, traversing is performed for N times.

In step (2), a minimum intra-class distance and a maximum inter-class distance of each sample in each batch are calculated, where there are always samples at a minimum intra-class distance and a maximum inter-class distance from each sample in one batch.

In step (3), the loss value $L_{E\_TriHard}^{b}$ of the triplet loss function is calculated by using the formula 3 and the formula 4.

In step (4), the loss value $L_{c}^{b}(x,y,\theta^{b})$ of the cross-entropy loss function is calculated by using the formula 2.

In step (5), each homogeneous branch is traversed, and $L_{E\_TriHard}^{b}$ of each branch are calculated according to the foregoing steps.

In step (6), the total loss value is calculated by using the formula 5.

It should be noted that, benefited from the natural similarity of the homogeneous branches, different homogeneous branches may be used as soft tags of each other for imitative learning, that is, the probability distribution of the final prediction results of the homogeneous branches may be similar through mutual imitative learning. Therefore, in this embodiment, mutual regularization between branches may be achieved through the KSP loss function based on knowledge synergy. In some embodiments, the process of determining the unidirectional knowledge synergy loss value of the KSP loss function in the embodiment includes:

calculating the unidirectional knowledge synergy loss value by using the classification-layer output feature of each sample in each homogeneous branch and the KSP loss function.

The KSP loss function is:

$$L_{ksp} = \min_{\theta} \frac{1}{N} \sum_{n=1}^{N} \sum_{\substack{(u,v)\in \mathbb{Z} \\ u \neq v}} \sum_{k=1}^{K} f_{c}^{k}(x_n, \theta^{u}) \log\left(\frac{f_{c}^{k}(x_n, \theta^{u})}{f_{c}^{k}(x_n, \theta^{v})}\right) \quad (6)$$

where $L_{ksp}$ represents the unidirectional knowledge synergy loss value, AT represents a total quantity of the training samples, u represents a $u^{th}$ homogeneous branch, v represents a $v^{th}$ with homogeneous branch, $\mathbb{Z}$ represents an optional space formed by any two homogeneous branches, K represents a dimension of the classification-layer output feature, $x_n$ represents an $n^{th}$ sample, $f_{c}^{k}(x_n, \theta^{u})$. represents a classification-layer output feature of $x_n$ in the $k^{th}$ dimension in the u th homogeneous branch, $f_{c}^{k}(x_n, \theta^{v})$ represents a classification-layer output feature of $x_n$ in the $k^{th}$ dimension in the with homogeneous branch, $\theta^{u}$ represents a network parameter of the $u^{th}$ homogeneous branch, and $\theta^{v}$ represents a network parameter of the $v^{th}$ with homogeneous branch.

In some embodiments, in order to achieve knowledge synergy and information exchange between branches, in the embodiments, a loss function based on knowledge synergy is added between two branches to achieve information exchange at different layers between homogeneous branches. The plurality of homogeneous branches provide different perspectives on the same data, and realize mutual regularization among branches through knowledge synergy between different perspectives, thus promoting the network to develop in a more accurate direction with the help of group intelligence. For the convenience of explanation, formula 6 is decomposed into the following two formulas:

$$L_{ksp}^{u,v} = \sum_{k=1}^{K} f_{c}^{k}(x_n, \theta^{u}) \log\left(\frac{f_{c}^{k}(x_n, \theta^{u})}{f_{c}^{k}(x_n, \theta^{v})}\right) \quad (7)$$

$$L_{ksp} = \min_{\theta} \frac{1}{N} \sum_{n=1}^{N} \sum_{\substack{(u,v)\in \mathbb{Z} \\ u \neq v}} L_{ksp}^{u,v} \quad (8)$$

As shown in the formulas 7 and 8, specific steps of the KSE loss function may be summarized as follows.

In step (1), all samples in each batch are traversed. As described above, it is assumed that each batch includes N samples, then traversing is performed for N times.

In step (2), the sample sequentially passes through the network, and a classification-layer output result of the sample in each homogeneous branch of the network is obtained. For example, for a sample $x_n$, it is assumed that the network includes three homogeneous branches, then there are totally three homogeneous branch classification-layer output results: $f_c(x_n, \theta^1)$, $f_c(x_n, \theta^2)$, and $f_c(x_n, \theta^3)$.

In step (3), for output results of all the branches, traversing in pairs. For example, in the present application, there are totally three branches 1, 2, and 3,and there are totally six combinations of the optional space $\mathbb{Z}$ formed by any two homogeneous branches: (1, 2,), (1, 3), (2, 1), (2, 3), (3, 1), (3, 2). It can be seen that the present solution is a unidirectional knowledge synergy approach, that is, when the homogeneous branch .u learns from the homogeneous branch v, the homogeneous branch v does not learn from the homogeneous branch .u. The unidirectional knowledge synergy loss value for each combination may be obtained through formula 7.

In step (4), according to formula 8, the unidirectional knowledge synergy loss values of all the combinations of all the samples are summed, and then averaging is performed to obtain a final unidirectional knowledge synergy loss value $L_{ksp}$.

Further, for the output results of all the branches, although mutual learning of the branches may improve robustness and a generalization ability of a system, it is inevitable to introduce classification noise, such as mutual learning between two branches. When branch A learns from branch B, there will inevitably be errors in the B label, which will inevitably introduce noise information. Therefore, in the embodiment, in order to enable the system to converge more stably, a new virtual label learning technology is constructed.

In the embodiment, the classification-layer output features of all homogeneous branches are first summed to obtain total classification-layer output features. Then, an average value of the total classification-layer output features is calculated as a virtual label of a virtual branch, that is, a calculation method of the virtual label $f_v$ is:

$$f_v = \sum_{b=1}^{B} f_c(x_n, \theta^{b})/B \quad (9)$$

where B represents a total quantity of the plurality of homogeneous branches, b represents a $b^{th}$ homogeneous branch, $x_n$ represents an $n^{th}$ sample, $\theta^{b}$ represents a classification-layer parameter of the $b^{th}$ homogeneous branch, and $f_c(x_n, \theta^{b})$ represents a classification-layer output feature of $x_n$ in the $b^{th}$ homogeneous branch.

After the virtual label $f_v$ is calculated, it is necessary to calculate the KSE loss function based on the virtual branches by combining the classification-level output features of all homogeneous branches with the virtual label $f_v$. That is, the target loss function in the present application also includes: the KSE loss function based on the virtual branches, and the KSE loss function based on the virtual branches is:

$$L_v = \sum_{b=1}^{B} f_v \log\left(\frac{f_v}{f_c(x_n, \theta^b)}\right) \quad (10)$$

where $L_v$ is a virtual-branch knowledge synergy loss value.

In summary, in the present embodiment, by adding the virtual-branch-based knowledge synergy loss function to the target loss function to determine the virtual-branch knowledge synergy loss value, and adding the virtual-branch knowledge synergy loss value to the total loss value, classification noise may be avoided when the branches learn from each other, thereby improving accuracy of the person Re-ID network in performing the person Re-ID task.

In summary, based on the foregoing process of calculating the loss value by using the cross-entropy loss function and the triplet loss function, the total loss value of the cross-entropy loss value, the triplet loss value, and the unidirectional knowledge synergy loss value may be obtained in combination with the unidirectional knowledge synergy loss value of the KSP loss function is:

$$L_{sum} = L + L_{ksp} \quad (11)$$

Further, when the target loss function also includes the knowledge synergy loss function based on the virtual branches, in the embodiment, the total loss also includes the virtual-branch knowledge synergy loss value, that is:

$$L_{sum} = L + L_{ksp} + L_v \quad (12).$$

In summary, in order to improve the accuracy of the network in training and application, and not increase the parameter quantity and the calculation amount of the network in application, the embodiment of the present application provides a knowledge synergy auxiliary training method, which carries out synergy training by reconstructing the network layer, adding KSE loss function and other ways to improve the performance of the network without increasing the parameter quantity and the calculation amount.

Taking the execution of person Re-ID tasks as an example, a complete embodiment is provided herein to clearly describe the present solution.

First: a network training process

Figure 6A:
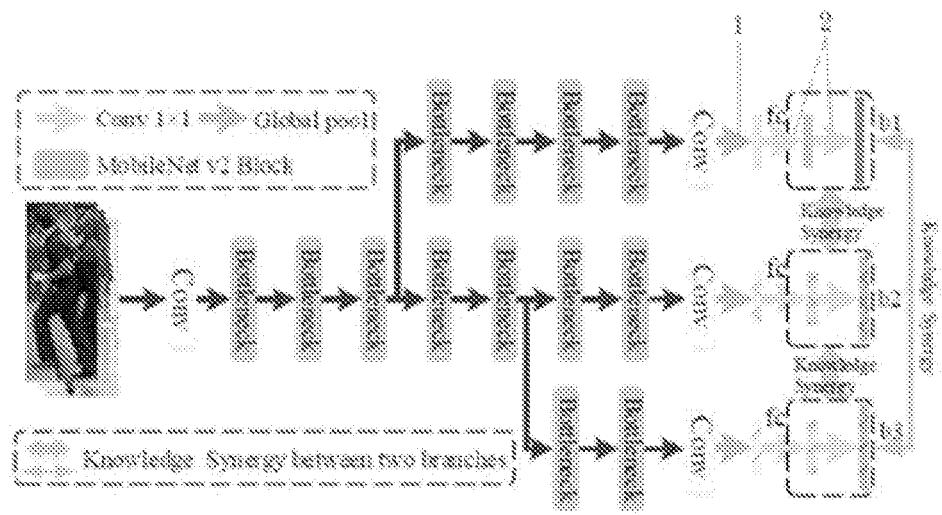
FIG. 6a is a schematic diagram of a specific structure of a homogeneous training network according to an embodiment of the present application.

1: The initial person Re-ID network is determined first, and the homogeneous training network corresponding to the initial person Re-ID network is created. FIG. 6*a* is a schematic diagram of a specific structure of the homogeneous training network according to an embodiment of the present application. FIG. 6*a* shows a typical network structure of MobileNet v2. A bottleneck network structure of MobileNet is a residual structure including multiple layers of deep separable convolutional networks that are stacked, is a fixed structure, and will not be elaborated herein. Cony represents a convolutional layer. Arrow 1 in each homogeneous branch represents a global pool layer. Arrow 2 in each homogeneous branch represents Cony 1×1. The structure in the figure is completely the same as that of MobileNet v2. Refer to FIG. 6*a*. In the present embodiment, based on the network structure of MobileNet v2, a homogeneous branch is derived from a third bottleneck output position, and a homogeneous branch is derived from a fifth bottleneck output position.

2: In the present embodiment, a cross-entropy loss, a triplet loss, and a KSP loss are constructed at the output-layer position, and training is performed. The double-ended arrow in FIG. 6*a* represents a knowledge synergy relationship between every two branches.

3: The network is trained to be converged, and the trained weight parameter of the network is stored.

Second: a network application process

Figure 6B:
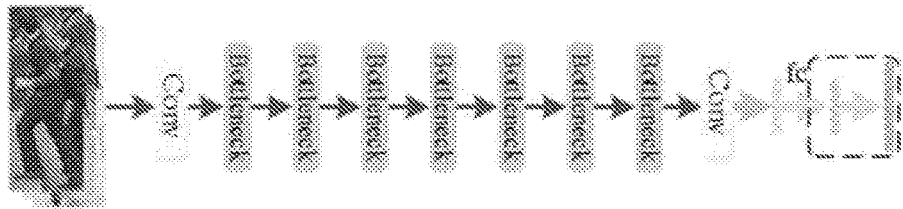
FIG. 6b is a schematic diagram of a specific structure of a final person Re-ID network according to an embodiment of the present application.

1: The auxiliary training branch is removed from the homogeneous training network, and the original main branch is retained, to obtain the initial person Re-ID network. The corresponding weight parameter is loaded based on the initial person Re-ID network to obtain the trained final person Re-ID network. FIG. 6*b* is a schematic diagram of a specific structure of the final person Re-ID network according to an embodiment of the present application.

Figure 6C:
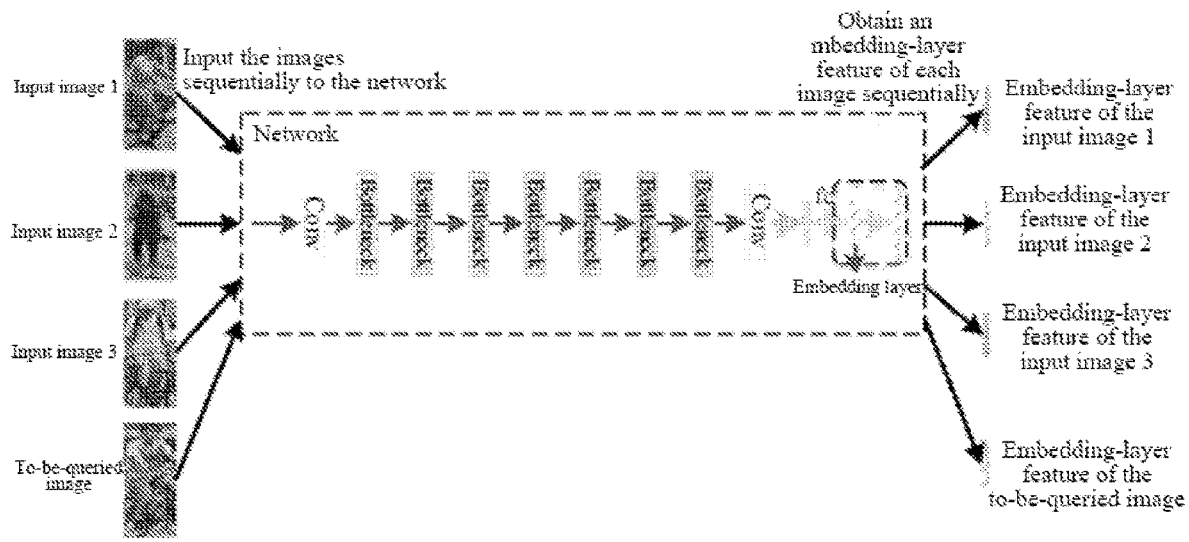
FIG. 6c is a schematic flow chart of performing a person Re-ID task according to an embodiment of the present application.

2: FIG. 6*c* is a schematic flowchart of performing the person Re-ID task according to an embodiment of the present application. It can be seen from FIG. 6*c* that in the present embodiment, when the final person Re-ID network is applied to the person Re-ID task, an input image 1, an input image 2, and an input image 3 are input to the final person Re-ID network to obtain embedding-layer features of the images in the network. The images 1, 2, and 3 form a query data set of the person Re-ID task. A to-be-queried image is input to the network to obtain an embedding-layer feature of the to-be-queried image.

3: The embedding-layer feature of the to-be-queried image is compared with all features (the embedding-layer features of the input image 1, the input image 2, and the input image 3) in the query data set. A comparison method is calculating distances between the embedding-layer feature of the to-be-queried image and all the features in the query data set, that is, calculating distances between vectors, and determining that a query data sample corresponding to a minimum distance and the to-be-queried image are the same person.

In summary, in the present solution, a homogeneous-branch-based auxiliary training method is proposed to construct multiple views for the input data. In addition, in the present solution, the auxiliary-branch-based triplet loss function is proposed, and a head network of each auxiliary branch is trained by using the loss function. Further, in the present solution, in order to implement information interaction between the homogeneous branches through knowledge synergy, the loss function based on knowledge synergy is added between every two branches in the present application to implement information interaction of different layers between the branches, the plurality of branches provide different viewpoints for the same data, and regularization between the branches is implemented by use of knowledge synergy between different viewpoints, thus improving the accuracy of the network.

The following describes a person Re-ID apparatus, a device, and a medium provided in the embodiments of the present application. The person Re-ID apparatus, the device, and the medium described below and the person Re-ID method described above may correspondingly refer to each other.

Figure 7:
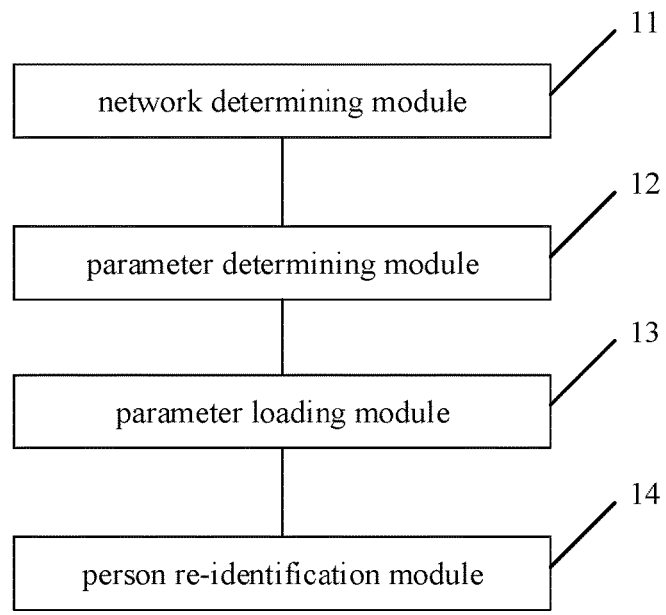
FIG. 7 is a schematic diagram of a structure of a person Re-ID apparatus according to an embodiment of the present application.

FIG. 7 is a schematic diagram of a structure of a person Re-ID apparatus according to an embodiment of the present application, including:

a network determining module 11, configured to determine a homogeneous training network corresponding to an initial person Re-ID network, where the homogeneous training network includes a plurality of homogeneous branches with a same network structure;

a parameter determining module 12, configured to train the homogeneous training network by using a target loss function, and determine a final weight parameter of each network layer in the homogeneous training network, where the target loss function includes a dynamic classification probability loss function based on knowledge synergy, and the dynamic classification probability loss function is used to determine a unidirectional knowledge synergy loss value between the homogeneous branches by using classification-layer output features of each training sample in every two homogeneous branches;

a parameter loading module 13, configured to load the final weight parameter by using the initial person Re-ID network to obtain a final person Re-ID network; and a person Re-ID module 14, configured to perform a person Re-ID task by using the final person Re-ID network.

The network determining module 11 is used for: deriving an auxiliary training branch from an intermediate layer of the initial person Re-ID network to generate a homogeneous training network with an asymmetric network structure, or deriving the auxiliary training branch from the intermediate layer of the initial person Re-ID network to generate a homogeneous training network with a symmetric network structure.

The parameter determining module 12 includes:

a loss value determining unit, configured, during training of the homogeneous training network, to determine a cross-entropy loss value of a cross-entropy loss function, determine a triplet loss value of a triplet loss function, and determine the unidirectional knowledge synergy loss value of the dynamic classification probability loss function; and a weight determining unit, configured to determine the final weight parameter of each network layer in the homogeneous training network by using a total loss value of the cross-entropy loss value, the triplet loss value, and the unidirectional knowledge synergy loss value.

The loss value determining unit includes:

a first determining subunit, configured to determine a first loss value of each homogeneous branch according to an embedding-layer output feature of each sample in each homogeneous branch and a first triple loss function; and a selection subunit, configured to select a first loss value that is numerically minimum from each homogeneous branch as the triplet loss value. The first triplet loss function is:

$$L^b_{TriHard} = -\frac{1}{N}\sum_{a=1}^{N}\left[\max_{y_p=y_a} d(f_e^a, f_e^p) - \min_{y_q \neq y_a} d(f_e^a, f_e^q) + m\right]_+,$$

where $L_{TriHard}^b$ represents a first loss value of a $b^{th}$ homogeneous branch, N represents a total quantity of training samples, a represents an anchor sample, $f_e^a$ represents an embedding-layer output feature of the anchor sample, y represents a classification tag of the sample, p represents a sample that belongs to a same classification tag as the anchor sample and that is at a maximum intra-class distance from the anchor sample, $f_e^p$ represents an embedding-layer output feature of the sample p, q represents a sample that belongs to a different classification tag from the anchor sample and that is at a minimum inter-class distance from the anchor sample, $f_e^q$ represents an embedding-layer output feature of the sample q, m represents a first parameter, $d(\cdot,\cdot\,0$ is used for calculating a distance, $[\cdot]_+$ and max $d(\cdot,\cdot)$ both represent calculation of a maximum distance, min $d(\cdot,\cdot)$ represents calculation of a minimum distance, $y_a$ represents a classification tag of the anchor sample, $y_p$ represents a classification tag of the sample p, and $y_q$ represents a classification tag of the sample q.

The loss value determining unit further includes:

a second determining subunit, configured to determine a second loss value of each homogeneous branch by using the first loss value of each homogeneous branch and a second triplet loss function.

The second triplet loss function is:

$$L^b_{E\_TriHard} = L^b_{TriHard} + \beta \frac{1}{N}\sum_{a=1}^{N}\left(\frac{d(f_e^a, f_e^p)}{d(f_e^a, f_e^q)}\right).$$

where $L_{E\_TriHard}^b$ represents a second loss value of the $b^{th}$ homogeneous branch, and $\beta$ represents a second parameter.

Correspondingly, the selection subunit is configured to select the second loss value that is numerically minimum from each homogeneous branch as the triplet loss value.

The loss value determining unit includes:

a calculation subunit, configured to calculate the unidirectional knowledge synergy loss value by using the classification-layer output feature of each sample in each homogeneous branch and the KSP loss function, where the KSP loss function is:

$$L_{ksp} = \min_\theta \frac{1}{N}\sum_{n=1}^{N}\sum_{\substack{(u,v)\in\mathbb{Z}\\u\neq v}}\sum_{k=1}^{K} f_c^k(x_n, \theta^u)\log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ homogeneous branch, $\mathbb{Z}$ represents an optional space formed by any two homogeneous branches, K represents a dimension of the classification-layer output feature, $x_n$ represents an $n^{th}$ sample, $f_c^k(x_n,\theta^u)$ represents a classification-layer output feature of $x_n$ in the $k^{th}$ dimension in the $u^{th}$ homogeneous branch, $f_c^k(x_n,\theta^v)$ represents a classification-layer output feature of $x_n$ in the $k^{th}$ dimension in the $v^{th}$ homogeneous branch, $\theta^u$ represents a network parameter of the $u^{th}$ homogeneous branch, and $\theta^v$ represents a network parameter of the $v^{th}$ with homogeneous branch.

Figure 8:
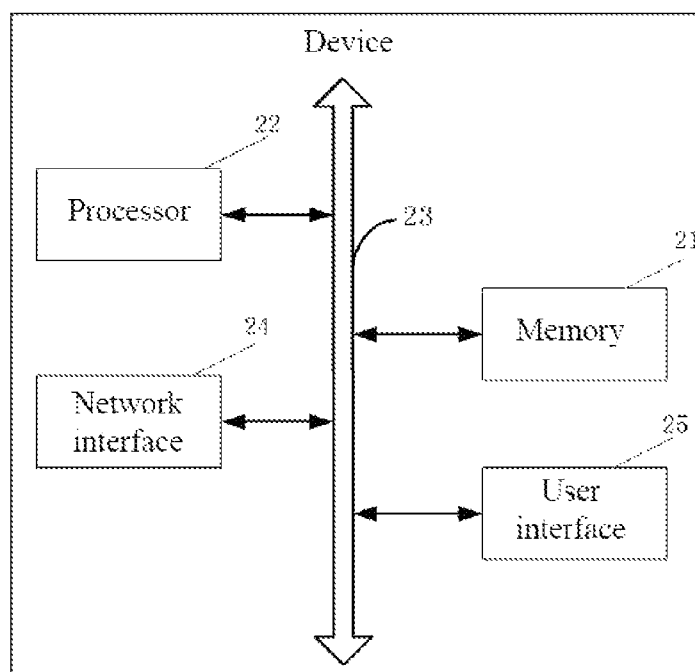
FIG. 8 is a schematic diagram of a structure of an electronic device according to an embodiment of the present application.

FIG. 8 is a schematic diagram of a structure of an electronic device according to an embodiment of the present application, including:

a memory 21, configured to store a computer program; and a processor 22, configured to execute the computer program to implement the steps of the person Re-ID method in any one of the foregoing method embodiments.

In the present embodiment, the device may be a Personal Computer (PC), or a terminal device such as a smartphone, a tablet computer, a palm computer, or a portable computer.

The device may include the memory 21, the processor 22, and a bus 23.

The memory 21 includes at least one type of readable storage medium. The readable storage medium includes a flash memory, a hard disk, a multimedia card, a card memory (for example, a Secure Digital (SD) or Data Register (DX) memory), a magnetic memory, a magnetic disk, an optical disk, and the like. In some embodiments, the memory 21 may be an internal storage unit of the device, for example, a hard disk of the device. In some other embodiments, the memory 21 may be an external storage device of the device, for example, a plug-in hard disk on the device, a Smart Media Card (SMC), an SD card, or a flash card. Further, the memory 21 may include both an internal storage unit and an external storage device of the device. The memory 21 may be configured not only to store application software installed in the device and various data, for example, program code for performing the person Re-ID method, but also to temporarily store data that has been output or is to be output.

In some embodiments, the processor 22 may be a Central Processing Unit (CPU), a controller, a microcontroller, a microprocessor, or another data processing chip, and is configured to run the program code stored in the memory 21 or process the data, for example, program code for performing the person Re-ID method.

The bus 23 may be a Peripheral Component Interconnect (PCI) bus, an Extended Industry Standard Architecture (EISA) bus, or the like. The bus may be divided into an address bus, a data bus, a control bus, and the like. For ease of representation, only one bold line is used for representation in FIG. 8, but it does not mean that there is only one bus or one type of bus.

Further, the device may include a network interface 24. In some embodiments, the network interface 24 may include a wired interface and/or a wireless interface (for example, a Wireless Fidelity (Wi-Fi) interface or a Bluetooth interface), and is generally configured to establish a communication connection between the device and another electronic device.

In some embodiments, the device may further include a user interface 25. The user interface 25 may include a display and an input unit such as a keyboard. In some embodiments, the user interface 25 may further include a standard wired interface and wireless interface. In some embodiments, the display may be a Light-Emitting Diode (LED) display, a liquid crystal display, a touch liquid crystal display, an Organic Light-Emitting Diode (OLED) touch display, or the like. The display may also be appropriately referred to as a display screen or a display unit, and is configured to display information processed in the device and display a visual user interface.

FIG. 8 shows the device with the components 21 to 25. It may be understood by a person skilled in the art that the structure shown in FIG. 8 does not form a limitation on the device, and fewer or more components than those shown in the figure may be included, or some components may be combined, or different component arrangements may be used.

An embodiment of the present application also provides a non-transitory computer-readable storage medium. The non-transitory computer-readable storage medium stores a computer program. The computer program is executed by a processor to implement the steps of the person Re-ID method in any one of the foregoing method embodiments.

The storage medium may include various media capable of storing program code, for example, a U disk, a mobile hard disk, a Read-Only Memory (ROM), a Random Access Memory (RAM), a magnetic disk, or an optical disk.

Each embodiment in the specification is described progressively. Descriptions made in each embodiment focus on differences from the other embodiments, and the same or similar parts in each embodiment refer to the other embodiments.

The disclosed embodiments are described above to enable a person skilled in the art to implement or use the present application. Various modifications to these embodiments are apparent to a person skilled in the art. The general principle defined herein may be implemented in other embodiments without departing from the spirit or scope of the present application. Therefore, the present application will not be limited to these embodiments shown herein but conforms to the largest scope consistent with the principles and novel characteristics disclosed herein.

The invention claimed is:

1. A person re-identification method, comprising:
   determining a homogeneous training network corresponding to an initial person re-identification network, wherein the homogeneous training network comprises a plurality of homogeneous branches with a same network structure;
   training the homogeneous training network by using a target loss function, and determining a final weight parameter of each network layer in the homogeneous training network, wherein the target loss function comprises a knowledge synergy for dynamic classification probability loss function, and the knowledge synergy for dynamic classification probability loss function is used to determine a unidirectional knowledge synergy loss value between the plurality of homogeneous branches by using classification-layer output features of each training sample in every two homogeneous branches; and
   loading the final weight parameter by using the initial person re-identification network to obtain a final person re-identification network, to perform a person re-identification task by using the final person re-identification network;
   wherein the training the homogeneous training network by using the target loss function and determining the final weight parameter of each network layer in the homogeneous training network comprises:
   during training of the homogeneous training network, determining a cross-entropy loss value of a cross-entropy loss function, determining a triplet loss value of a triplet loss function, and determining the unidirectional knowledge synergy loss value of the knowledge synergy for dynamic classification probability loss function; and
   determining the final weight parameter of each network layer in the homogeneous training network by using a total loss value of the cross-entropy loss value, the triplet loss value, and the unidirectional knowledge synergy loss value;
   wherein a process of determining the unidirectional knowledge synergy loss value of the knowledge synergy for dynamic classification probability loss function comprises:
   calculating the unidirectional knowledge synergy loss value by using the classification-layer output feature of each sample in each homogeneous branch and the knowledge synergy for dynamic classification probability loss function, wherein the knowledge synergy for dynamic classification probability loss function is:

$$L_{ksp} = \min_{\theta} \frac{1}{N} \sum_{n=1}^{N} \sum_{\substack{(u,v)\in \mathbb{Z} \\ u \neq v}} \sum_{k=1}^{K} f_c^k(x_n, \theta^u) \log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ with homogeneous branch, $\mathbb{Z}$ represents an optional space formed by any two homogeneous branches, K represents a dimension of the classification-layer output feature, $x_n$ represents an $n^{th}$ sample, $f_c^k(x_n, \theta^u)$ represents a classification-layer output feature of in the $k^{th}$ dimension in the $u^{th}$ homogeneous branch, $f_c^k(x_n, \theta^v)$ represents a classification-layer output feature of $x_n$ in the $k^{th}$ dimension in the $v^{th}$ with homogeneous branch, $\theta^u$ represents a network parameter of the $u^{th}$ homogeneous branch, and $\theta^v$ represents a network parameter of the $v^{th}$ homogeneous branch, wherein N and K are positive integers.

2. The person re-identification method according to claim 1, wherein the determining a homogeneous training network corresponding to the initial person re-identification network comprises:
deriving an auxiliary training branch from an intermediate layer of the initial person re-identification network to generate the homogeneous training network with an asymmetric network structure.

3. The person re-identification method according to claim 1, wherein the determining a homogeneous training network corresponding to the initial person re-identification network comprises:
deriving an auxiliary training branch from an intermediate layer of the initial person re-identification network to generate a homogeneous training network with a symmetric network structure.

4. The person re-identification method according to claim 1, wherein a process of determining the triplet loss value of the triplet loss function comprises:
determining a first loss value of each homogeneous branch according to an embedding-layer output feature of each sample in each homogeneous branch and a first triple loss function;
and selecting a first loss value that is numerically minimum from each homogeneous branch as the triplet loss value;
wherein the first triplet loss function is:

$$L_{TriHard}^b = -\frac{1}{N} \sum_{a=1}^{N} \left[\max_{y_p=y_a} d(f_e^a, f_e^p) - \min_{y_q \neq y_a} d(f_e^a, f_e^q) + m\right]_+,$$

where $L_{TriHard}^b$ represents a first loss value of a $b^{th}$ homogeneous branch, N represents a total quantity of the training samples, a represents an anchor sample, $f_e^a$ represents an embedding-layer output feature of the anchor sample, y represents a classification tag of the sample, p represents a sample that belongs to a same classification tag as the anchor sample and that is at a maximum intra-class distance from the anchor sample, $f_e^p$ represents an embedding-layer output feature of the sample p, q represents a sample that belongs to a different classification tag from the anchor sample and that is at a minimum inter-class distance from the anchor sample, $f_e^q$ represents an embedding-layer output feature of the sample q, m represents a first parameter, $d(\cdot,\cdot)$ is used for calculating a distance, $[\cdot]_+$ and max $d(\cdot,\cdot)$ both represent calculation of a maximum distance, min $d(\cdot,\cdot)$ represents calculation of a minimum distance, $y_a$ represents a classification tag of the anchor sample, $y_p$ represents a classification tag of the sample p, and $y_q$ represents a classification tag of the sample q.

5. The person re-identification method according to claim 4, wherein after the determining a first loss value of each homogeneous branch, the method further comprises:
determining a second loss value of each homogeneous branch by using the first loss value of each homogeneous branch and a second triplet loss function, wherein the second triplet loss function is:

$$L_{E\_TriHard}^b = L_{TriHard}^b + \beta \frac{1}{N} \sum_{a=1}^{N} \left(\frac{d(f_e^a, f_e^p)}{d(f_e^a, f_e^q)}\right),$$

where $L_{E\_TriHard}^b$ represents a second loss value of the $b^{th}$ homogeneous branch, and $\beta$ represents a second parameter; and
correspondingly, the selecting a first loss value that is numerically minimum from each homogeneous branch as the triplet loss value comprises:
selecting the second loss value that is numerically minimum from each homogeneous branch as the triplet loss value.

6. The person re-identification method according to claim 5, wherein the cross-entropy loss function is:

$$L_c^b(x, y, \theta^b) = -\frac{1}{N} \sum_{n=1}^{N} \sum_{k=1}^{K} y_n^k \log(f_c^k(x_n, \theta^b)),$$

wherein a network input is represented as $D_t = \{(x_n, y_n) | n \in [1,N]\}$, N represents a total quantity of sample images, $x_n$ represents an $n^{th}$ image, $y_n$ represents a classification tag corresponding to this image, $f_c(x_n\theta^b)$ represents an output feature of a network model, and the subscript c represents obtaining a classification-layer feature of the network after passing through a softmax layer, K represents a dimension of a classification-layer feature vector output by the network, $L_c^b(x, y, \theta^b)$ represents a cross-entropy loss function of a $b^{th}$ homogeneous branch, and $\theta^b$ represents a network parameter of the $b^{th}$ homogeneous branch.

7. The person re-identification method according to claim 6, wherein after the second loss value is calculated, the method further comprises:
obtaining a total loss function according to the cross-entropy loss calculated by using the cross-entropy loss function and the triplet loss calculated by using the second triplet loss function, wherein the total loss function is:

$$L = \min_{\theta} \sum_{b=1}^{B} \left(\alpha^b L_c^b(x, y, \theta^b) + \gamma^b L_{E\_TriHard}^b\right)$$

where $\gamma$ represents a hyperparameter, and B represents a quantity of the plurality of homogeneous branches, wherein B is a positive integer.

8. The person re-identification method according to claim 1, wherein the training of the homogeneous training network comprises:
- selecting a derivation position from a backbone network according to a network structure of the initial person Re-ID network, determining an intermediate layer from which an auxiliary training branch is derived, and constructing a homogeneous-network-based auxiliary training branch to obtain the homogeneous training network;
- determining the target loss function, and calculating a loss of each homogeneous branch in the homogeneous training network by using the target loss function;
- training a network according to the target loss function to converge the network; and
- storing a trained weight parameter.

9. The person re-identification method according to claim 8, wherein the training of the homogeneous training network comprises a first phase and a second phase;
- the first phase is a forward propagation phase in which data is propagated from a lower layer to a higher layer, and the second phase is a back propagation phase in which an error is propagated for training from the higher layer to the lower layer when a result obtained by forward propagation is inconsistent with what is expected.

10. The person re-identification method according to claim 9, wherein the training a network comprises:
- initializing a weight of a network layer;
- performing forward propagation on input training image data through each network layer, to obtain an output value;
- calculating an error between the output value of the network and a target value;
- back propagating the error to the network, and sequentially calculating a back propagation error of each network layer;
- adjusting, by each network layer, all weight coefficients in the network according to the back propagation error of each layer;
- reselecting randomly new training image data, and then performing the step of performing the forward propagation to obtain the output value of the network;
- repeating infinitely iteration, and ending the training when an error between the output value of the network and a target value is less than a specific threshold or a quantity of iterations exceeds a specific threshold; and
- storing trained network parameters of all layers.

11. The person re-identification method according to claim 10, wherein the network layers comprise: a convolutional layer, a down-sampling layer, and a fully connected layer.

12. The person re-identification method according to claim 10, wherein the calculating an error between the output value of the network and a target value comprises:
- calculating the output value of the network and obtaining a total loss value based on the target loss function.

13. The person re-identification method according to claim 1, wherein the loading the final weight parameter by using the initial person re-identification network to obtain a final person re-identification network comprises:
- loading the final weight parameter by using the initial person re-identification network without auxiliary training branches to obtain the final person re-identification network.

14. The person re-identification method according to claim 1, wherein the knowledge synergy for dynamic classification probability loss function is decomposed into a first formula and a second formula;

the first formula is:

$$L_{ksp}^{u,v} = \sum_{k=1}^{K} f_c^k(x_n, \theta^u) \log\left(\frac{f_c^k(x_n, \theta^u)}{f_c^k(x_n, \theta^v)}\right),$$

and the second formula is:

$$L_{ksp} = \min_{\theta} \frac{1}{N} \sum_{n=1}^{N} \sum_{\substack{(u,v) \in \mathbb{Z} \\ u \neq v}} L_{ksp}^{u,v}.$$

15. The person re-identification method according to claim 1, wherein the method further comprises:
- summing the classification-layer output features of the plurality of homogeneous branches to obtain total classification-layer output features;
- calculating an average value of the total classification-layer output features as a virtual label of a virtual branch, wherein a calculation method of the virtual label $f_v$ is:

$$f_v = \sum_{b=1}^{B} f_c(x_n, \theta^b)/B$$

where B represents a total quantity of the plurality of homogeneous branches, b represents a $b^{th}$ homogeneous branch, $x_n$ represents an $n^{th}$ sample, $\theta^b$ represents a network parameter of the $b^{th}$ homogeneous branch, and $f_c(x_n, \theta^b)$ represents a classification-layer output feature of $x_n$ in the $b^{th}$ homogeneous branches, wherein B is a positive integer.

16. The person re-identification method according to claim 15, wherein after the virtual label $f_v$ is calculated, the method further comprises:
- calculate the knowledge synergy loss function based on the virtual branches by combining the classification-level output features of the plurality of homogeneous branches with the virtual label $f_v$, wherein the knowledge synergy loss function based on the virtual branches is:

$$L_v = \sum_{b=1}^{B} f_v \log\left(\frac{f_v}{f_c(x_n, \theta^b)}\right).$$

17. An electronic device, comprising:
- a memory, configured to store a computer program; and
- a processor, configured to execute the computer program to implement operations comprising:
  - determining a homogeneous training network corresponding to an initial person re-identification network, wherein the homogeneous training network comprises a plurality of homogeneous branches with a same network structure;
  - training the homogeneous training network by using a target loss function, and determining a final weight parameter of each network layer in the homogeneous training network, wherein the target loss function comprises a knowledge synergy for dynamic classification probability loss function, and the knowledge synergy for dynamic classification probability loss function is used to determine a unidirectional knowledge synergy loss value between the plurality of homogeneous branches by using classification-layer output features of each training sample in every two homogeneous branches; and loading the final weight parameter by using the initial person re-identification network to obtain a final person re-identification network, to perform a person re-identification task by using the final person re-identification network;

wherein the training the homogeneous training network by using a target loss function and determining a final weight parameter of each network layer in the homogeneous training network comprises:

during training of the homogeneous training network, determining a cross-entropy loss value of a cross-entropy loss function, determining a triplet loss value of a triplet loss function, and determining the unidirectional knowledge synergy loss value of the knowledge synergy for dynamic classification probability loss function; and determining the final weight parameter of each network layer in the homogeneous training network by using a total loss value of the cross-entropy loss value, the triplet loss value, and the unidirectional knowledge synergy loss value;

wherein a process of determining the unidirectional knowledge synergy loss value of the knowledge synergy for dynamic classification probability loss function comprises:

calculating the unidirectional knowledge synergy loss value by using the classification-layer output feature of each sample in each homogeneous branch and the knowledge synergy for dynamic classification probability loss function, wherein the knowledge synergy for dynamic classification probability loss function is:

$$L_{ksp} = \min_{\theta} \frac{1}{N} \sum_{n=1}^{N} \sum_{\substack{(u,v) \in \mathbb{Z} \\ u \neq v}} \sum_{k=1}^{K} f_c^k(x_n, \theta^u) \log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ with homogeneous branch, $\mathbb{Z}$ represents an optional space formed by any two homogeneous branches, K represents a dimension of the classification-layer output feature, $x_n$ represents an $n^{th}$ sample, $f_c^k(x_n, \theta^u)$ represents a classification-layer output feature of $x_n$ in the $k^{th}$ dimension in the $u^{th}$ homogeneous branch, $f_c^k(x_n, \theta^v)$ represents a classification-layer output feature of $x_n$ in the $k^{th}$ dimension in the with homogeneous branch, $\theta^u$ represents a network parameter of the $u^{th}$ homogeneous branch, and $\theta^v$ represents a network parameter of the $v^{th}$ homogeneous branch, wherein N and K are positive integers.

18. A non-transitory computer-readable storage medium, wherein the computer-readable storage medium stores a computer program, and the computer program is executed by a processor to implement operations comprising:

determining a homogeneous training network corresponding to an initial person re-identification network, wherein the homogeneous training network comprises a plurality of homogeneous branches with a same network structure;

training the homogeneous training network by using a target loss function, and determining a final weight parameter of each network layer in the homogeneous training network, wherein the target loss function comprises a knowledge synergy for dynamic classification probability loss function, and the knowledge synergy for dynamic classification probability loss function is used to determine a unidirectional knowledge synergy loss value between the plurality of homogeneous branches by using classification-layer output features of each training sample in every two homogeneous branches; and loading the final weight parameter by using the initial person re-identification network to obtain a final person re-identification network, to perform a person re-identification task by using the final person re-identification network;

wherein the training the homogeneous training network by using the target loss function and determining the final weight parameter of each network layer in the homogeneous training network comprises:

during training of the homogeneous training network, determining a cross-entropy loss value of a cross-entropy loss function, determining a triplet loss value of a triplet loss function, and determining the unidirectional knowledge synergy loss value of the knowledge synergy for dynamic classification probability loss function; and determining the final weight parameter of each network layer in the homogeneous training network by using a total loss value of the cross-entropy loss value, the triplet loss value, and the unidirectional knowledge synergy loss value;

wherein a process of determining the unidirectional knowledge synergy loss value of the knowledge synergy for dynamic classification probability loss function comprises:

calculating the unidirectional knowledge synergy loss value by using the classification-layer output feature of each sample in each homogeneous branch and the knowledge synergy for dynamic classification probability loss function, wherein the knowledge synergy for dynamic classification probability loss function is:

$$L_{ksp} = \min_{\theta} \frac{1}{N} \sum_{n=1}^{N} \sum_{\substack{(u,v) \in \mathbb{Z} \\ u \neq v}} \sum_{k=1}^{K} f_c^k(x_n, \theta^u) \log\left(\frac{f_c^k(x_n, \theta^u)}{f_c^k(x_n, \theta^v)}\right)$$

where $L_{ksp}$ represents the unidirectional knowledge synergy loss value, N represents a total quantity of the training samples, u represents a $u^{th}$ homogeneous branch, v represents a $v^{th}$ homogeneous branch, $\mathbb{Z}$ represents an optional space formed by any two homogeneous branches, K represents a dimension of the classification-layer output feature, $x_n$ represents an $n^{th}$ sample, $f_c^k(x_n, \theta^u)$ represents a classification-layer output feature of $x_n$ in the $k^{th}$ dimension in the $u^{th}$ homogeneous branch, $f_c^k(x_n, \theta^v)$ represents a classification-layer output feature of $x_n$ in the $k^{th}$ dimension in the $v^{th}$ homogeneous branch, $\theta^u$ represents a network parameter of the $u^{th}$ homogeneous branch, and $\theta^v$ represents a network parameter of the $v^{th}$ homogeneous branch, wherein N and K are positive integers.

* * * * *